Dec. 5, 1967 R. W. REICH 3,356,919

TRANSISTOR CIRCUIT FOR THE OPERATION OF ELECTRONIC CLOCKS

Filed June 8, 1961 3 Sheets-Sheet 1

Inventor
ROBERT WALTER REICH

By Toulmin & Toulmin
Attorneys

Dec. 5, 1967 R. W. REICH 3,356,919

TRANSISTOR CIRCUIT FOR THE OPERATION OF ELECTRONIC CLOCKS

Filed June 8, 1961 3 Sheets-Sheet 2

Inventor
ROBERT WALTER REICH

By Toulmin & Toulmin
Attorneys

TRANSISTOR CIRCUIT FOR THE OPERATION OF ELECTRONIC CLOCKS

Filed June 8, 1961 3 Sheets-Sheet 3

Inventor
ROBERT WALTER REICH
By Toulmin & Toulmin
Attorneys

United States Patent Office 3,356,919

Patented Dec. 5, 1967

3,356,919

TRANSISTOR CIRCUIT FOR THE OPERATION OF ELECTRONIC CLOCKS

Robert Walter Reich, Merzhauserstr. 143, Freiburg im Breisgau, Germany

Filed June 8, 1964, Ser. No. 373,294
Claims priority, application Germany, Dec. 9, 1963, R 36,751
6 Claims. (Cl. 318—128)

This invention relates to electronic clockworks and the like and is particularly concerned with an arrangement for obtaining strong excitation pulses to the base of a transistor for positive control of the transistor.

The development of excitation voltage for opening a transistor has always been a problem in connection with electronic clockworks, particularly with transistors of the silicon type in connection with which the voltage pulse developed in an excitation coil as a magnet passes by the coil would be too low to open the transistor.

Many devices have been proposed for developing excitation voltage from an exciter coil in response to movement of the oscillating member, but heretofore all such devices have been quite sensitive to voltage and temperature because the developed voltage pulse from the exciting coil was relatively low and left little margin within which to take care of temperature and voltage variations.

Furthermore, exciter coils are necessarily quite small, particularly for clockworks to be used with watches, and in order to obtain proper operating conditions, it is necessary to be certain that the voltage pulse in the exciter coil is sharp and occurs within an extremely short interval of time. The short interval of time permissible for the voltage pulse from the exciter coil requires that these coils be relatively narrow in the direction of movement of the oscillatory member and this, in turn, limits the exciter voltages that can be developed therein. For silicon transistors, for example, having a gate voltage of about 6/10 volt and an opening voltage of about two to three volts at the base, such an arrangement would be simply inoperative. The voltage developed in the exciter coil would not be great enough to open any known silicon transistor.

With germanium transistors with considerably lower opening voltages, the exciter voltage obtainable is so near the necessary opening voltage that the system is quite sensitive to variations in voltage and temperature.

Having the foregoing in mind, it is a primary object of the present invention to provide an arrangement wherein a transistorized electronic clockwork is made that is not sensitive to temperature and voltage conditions.

Another object of this invention is the provision of an arrangement referred to in which, with relatively small exciter coil means, an extremely short duration voltage pulse can be developed in the exciter coil means but which, however, has ample amplitude under all conditions for opening the transistor connected thereto even where this transistor is a silicon type.

In the practice of the present invention, the basic idea is the enhancement or multiplication of the voltage pulse from the exciter coil means so that adequate transistor opening voltage is available at all times. According to one modification of the present invention, a plurality of exciter coils are connected in series and are so related to exciting magnets that only in one position of the oscillating element are the voltage pulses of the individual exciter coils in phase and in additive relation, whereby in only this one position is there the development of opening voltage for the transistor. The last described arrangement is accomplished either by locating the exciter coils and their actuating magnets asymmetrically, or by reversing one or more of the coils and the exciting magnets therefor so that there is only one relative position of the oscillator and exciter coils which will produce a transistor opening pulse.

Another form which the invention can take utilizes a transformer, disposed between the source of exciting impulses and the base of the transistor to be controlled, and in this particular modification, a single exciter coil is ample or a source of pulsations which are under the control, for example, of a quartz crystal might be employed.

In still another form which the invention can take, the exciter coil takes the form of a transformer or an auto transformer so that a voltage pulse is available therefrom in excess of the voltage of the pulse produced in the coil inductively by the movement of the exciting magnet past the coil.

The foregoing objects and advantages of this invention will become more apparent upon reference to the following specification taken in connection with the accompanying drawings, in which:

FIGURES 1 and 1*a* show in plan and side view respectively one modification of the present invention with respect to the arrangement of the coils or magnets;

FIGURES 2 and 2*a* show a plan and side view respectively another modification;

FIGURE 3 and 3*a* show in plan and side view respectively a third modification;

FIGURES 4 and 4*a* show in plan and side elevation respectively, still another modification somewhat similar to that of FIGURES 3 and 3*a*;

FIGURES 5 and 5*a* show plan and side elevational views respectively of still another modification;

Figures 1, 1A:
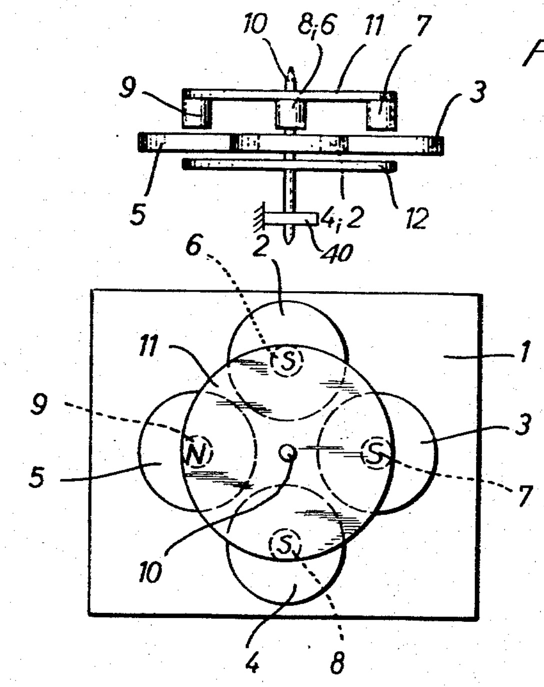

Referring to the drawings somewhat more in detail, in FIGURE 1, reference numeral 1 indicates the support for the coils which include the driver coil 2 and a plurality of excitation coils 3, 4 and 5. The shaft for the oscillating portion is indicated at 10 and connected thereto is carrier 11 on which are mounted magnets 6, 7, 8 and 9. Coils 3, 4 and 5 are connected in series with coils 3 and 4 wound in one direction and coil 5 wound in the opposite direction. Alternatively, the coils can be wound in the same direction and coil 5 connected reversely to coils 3 and 4.

As viewed in FIGURE 1, magnets 6, 7 and 8 have their south poles adjacent their respective coils, whereas magnet 9 has its north pole adjacent its coil. Because of the reversed relation of magnet 9 relative to the other magnets, there is only one position of the oscillatory member in which voltage pulses are developed in the exciter coils 3, 4 and 5, which will be additive and in phase and which will supply a voltage pulse sufficient to open the transistor that supplies current to driving coil 2. By using a plurality of exciter coils and one reversed magnet, it will be evident that compact structures can be made while strong exciting voltages are available in the one position only of the oscillating member.

The oscillatory member in these views, as well as in the other views, is in the null position which is also the position in which the transistor is opened by the exciter pulse. A conventional biasing spring (not shown) biases the oscillatory member toward its null position.

Figures 2, 2A:
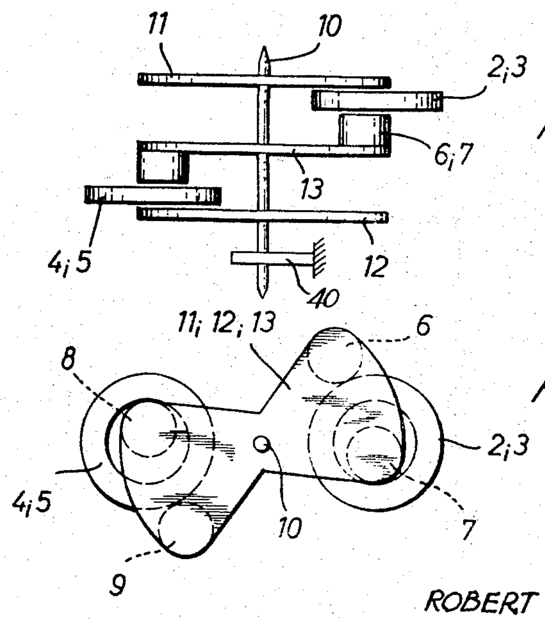

FIGURE 2 shows a slightly different arrangement, with the same reference numerals employed where applicable, except in addition to support 11 there are supports 12 and 13 connected to shaft 10. In this figure the driving coil 2 is concentric with an exciter coil 3, and other exciter coils 4 and 5 are arranged in spaced relation to the driving coil. With this arrangement also there is only one position of the oscillatory member in 360° of travel thereof from its null position in each direction that will produce sufficient voltage to release power through the transistor to the driving coil.

Figures 3, 3A, 4, 4A, 5, 5A:
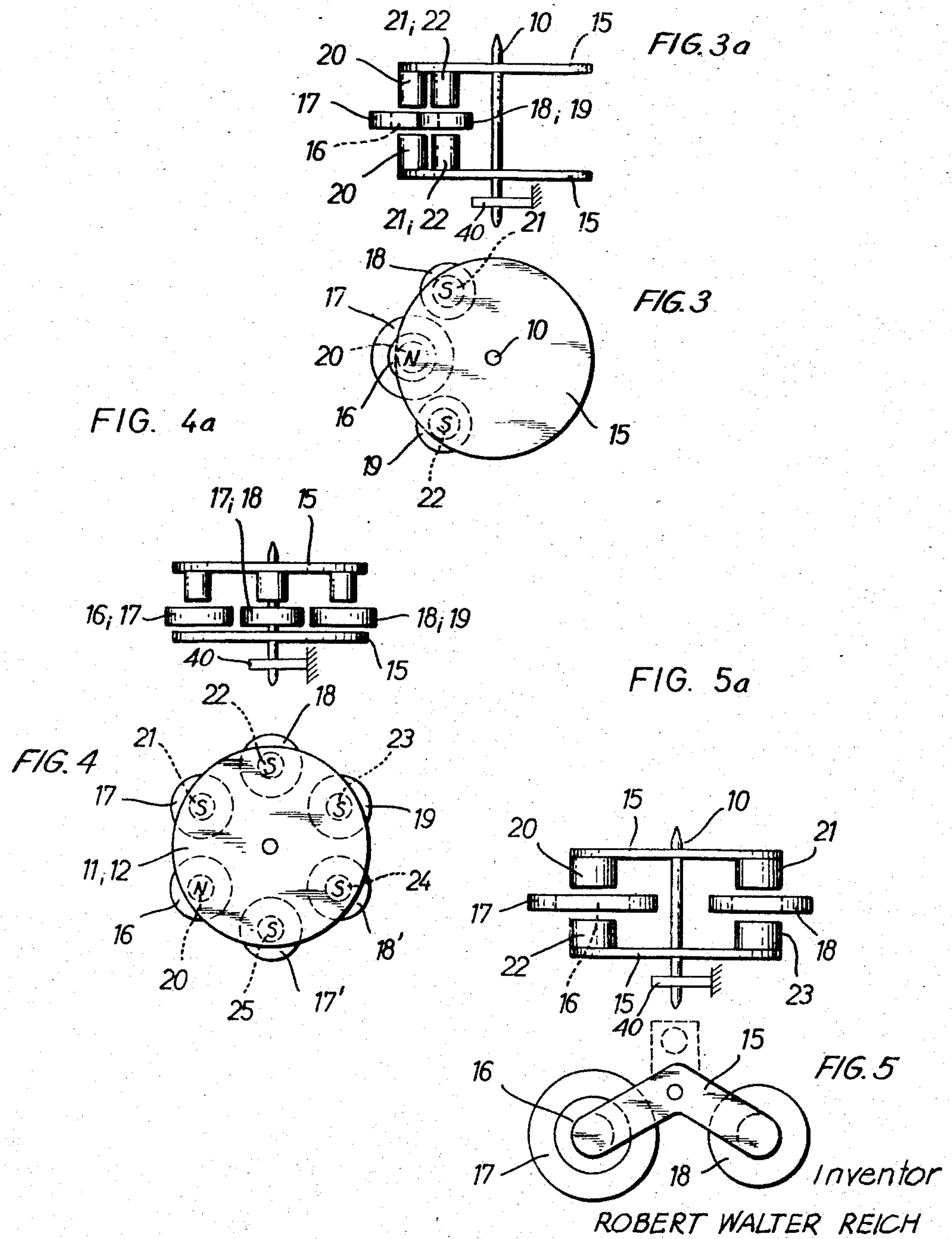

In FIGURES 3 and 3*a* the shaft 10 carries supporting members 15 on which magnets 20, 21 and 22 are carried to define a gap in which excitation coils 17, 18 and 19 are located with a driving coil 16 being located concentrically with exciter coil 17. In these figures the magnet arrangement at 20 passes magnetic lines in one direction through the coils while the magnets at 21 and 22 pass the magnetic lines in the opposite direction. Coil 17 is wound reversely to coils 18, 19 and the coils are serially connected so that only as the oscillatory member passes through its null position is there a transistor opening pulse developed in the serially connected exciter coils.

In FIGURES 4 and 4*a* a somewhat similar arrangement is illustrated and the same reference numerals are applied where applicable. The carriers are indicated at 15 and mounted thereon are magnet 20 phased in one direction and magnets 21, 22, 23, 24 and 25 all phased in the other direction.

The driver coil is indicated at 16 and a plurality of exciter coils are indicated at 17, 18, 19, 17' and 18'. Due to the reverse position of magnet 20, there is only one position of the oscillatory member in which the serially connected exciter coils will develop a combined voltage pulse sufficient to open a transistor and release driving power to driver coil 16. In this case, all of the exciter coils can be wound in the same direction.

In FIGURES 5 and 5*a* another arrangement is shown wherein the same reference numerals have been applied. In this arrangement the carriers 15 carry the south poles 21 and 23 at one side and define a gap in which exciter coil 18 is located, whereas on the other side south pole 22 and north pole 20 define a gap in which exciter coil 17 and concentric driver coil 16 are located. It will be appreciated that in this instance also there is only one position of the oscillatory member in which transistor opening voltage pulses can be developed.

Figure 6:
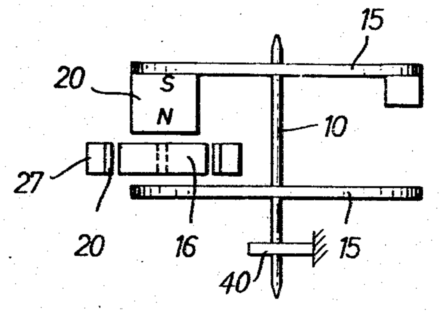
FIGURE 6 shows a side view of a modification in which the exciter coil is in the form of an auto transformer.

In FIGURE 6 driver coil 16 is mounted adjacent the pole of a magnet 20 on carrier 15 and surrounding driver coil 16 an exciter coil arrangement in the form of a transformer having primary 26 and secondary 27. This transformer, can, for example, be an auto transformer where space will permit this construction.

Figure 7:
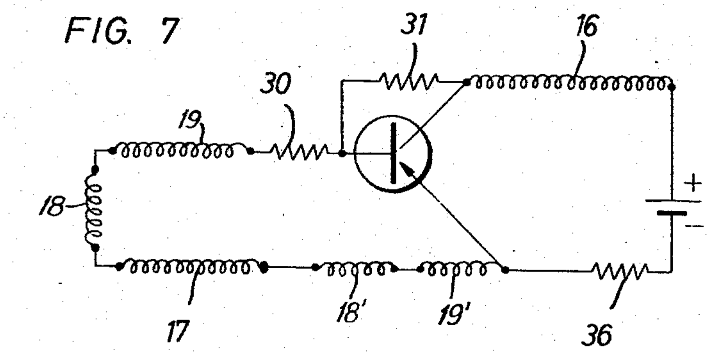
FIGURE 7 shows a circuit diagram wherein a voltage divider is employed for influencing the gate and opening voltages of the transistor.

In FIGURE 7 there is shown a circuit embodying a transistor T and in the base-emitter circuit thereof are connected the serially arranged exciter coils. These exciter coils are also connected through a voltage divider in the form of resistors 30, 31 with one end of driving coil 16, which is in the emitter-collector circuit, in series with a battery B and a control resistor 36.

Figure 8:
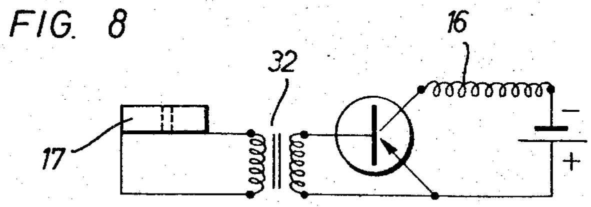
FIGURE 8 shows a circuit arrangement wherein a transformer is positioned between the source of exciting pulses and the base of the transistor.

In FIGURE 8 reference numeral 17 indicates a source of excitation pulses such as a single excitor coil or a plurality of exciter coils in series, or a voltage source under the control of a quartz crystal or the like. In any case voltage pulses developed to a primary side of the transformer 32 are amplified in the secondary of the transformer which is connected in the base emitter circuit of transistor T. Driving coil 16 in the emitter-collector circuit is in series with battery B.

When using the transformer 32, the exciter coil 17 can be constructed of fewer turns and of heavier wire than normally employed because the secondary side of the transformer, even though the transformer is quite small, will produce a voltage pulse of the desired voltage. The transformer may be quite simple consisting, for example, of two coils wound on a small solid cylindrical core. The provision of the transformer permits considerable latitude in the design of the excitation coil and its exciting magnet.

All of the arrangements disclosed are relatively simple and simplify the coil and magnet construction and permit the mechanisms to be made extremely small.

The clockworks according to the present invention are no longer sensitive to temperature and voltage variations in the degree heretofore known. Furthermore, by the use of the compensating resistor arrangement shown in FIGURE 7, the smallest possible functional dependency can be obtained. It becomes possible, in fact, to provide transistor controlled clocks for automobiles and the like and maintain the necessary operating conditions for the clocks.

Each modification of FIGURES 1 through 5 is characterized in that there is only one position in 360° of rotation of the oscillatory member on each side of its null position in which a pulse large enough to open the transistor is developed in the exciter coil means. The conventional biasing spring is shown at 40 for each modification.

The circuit of FIG. 7 could be that for the modification of FIGS. 4, 4*a* wherein five exciter coils are serially connected and have pulses induced therein when the oscillatory member passes through null position that add up to enough to open the transistor. Due to the reversed position of magnet 20 for driving coil 16, when the oscillatory member is in any position other than its null position, instead of five pulses adding together, there will be only four pulses in one direction and one in the opposite direction making a total of only three pulses in the direction to open the transistor which, by the selection of the transistor and the exciter coils, is not sufficient to open the transistor.

It will be understood that this invention is susceptible to modification in order to adapt it to different usages and conditions; and accordingly, it is desired to comprehend such modifications within this invention as may fall within the scope of the appended claims.

I claim:

1. An electronic device for maintaining mechanical oscillations comprising; a mechanical oscillator member having a null position and having a swing of less than 360° on each side of the null position and being adapted to be biased toward said null position, a plurality of magnets on said member spaced circumferentially thereof, a plurality of stationary exciter coils adjacent said member positioned for respective registration with said magnets in the null position of said member so that movement of the member through its null position will induce voltages in said exciter coils, a driver coil, a magnet element on said member which registers with said driver coil in the null position of said member so a pulse of current to said driver coil will exert an impelling force on said member via said magnet element; a transistor said exciter coils being connected to supply a voltage pulse in the base emitter circuit of said transistor; a battery, said battery and driver coil being serially connected in the emitter-collector circuit of said transistor, one of said magnets and magnet element being poled in one direction and the others thereof being poled in the opposite direction, said exciter coils being so connected in series that the respective voltage pulses induced therein by their respective magnets passing thereby will be in additive relation in the base-emitter circuit of the transistor only as the member passes through its null position.

2. A device according to claim 1 in which there are at least three magnets on said member and a corresponding number of exciter coils which respectively register therewith in the null position of said member.

3. A device according to claim 1 in which said magnet element is one of said magnets and said driver coil is coaxial with one of said exciter coils.

4. A device according to claim 1 in which said magnet element is separate from said magnets and said driver coil is spaced from said exciter coils.

5. A device according to claim 1 in which said magnets and exciter coils are asymmetrically located with respect to the axis of oscillation of said member.

6. A device according to claim 1 in which a first resistor is connected between the base and collector of the transistor and a second resistor is connected between said base and said exciter coils.

References Cited

UNITED STATES PATENTS

| | | | |
|---|---|---|---|
| 2,831,114 | 4/1958 | Van Overbeck | 331—116 |
| 2,843,742 | 7/1958 | Cluwen | 318—132 X |

| | | | |
|---|---|---|---|
| 2,909,732 | 10/1959 | Van Overbeck | 331—116 |
| 3,095,528 | 6/1963 | Dome | 310—36 X |
| 3,123,755 | 3/1964 | Braithwaite | 318—132 |
| 3,124,730 | 3/1964 | Thoma | 318—132 X |
| 3,040,225 | 6/1962 | Reich | 318—132 |
| 3,149,274 | 9/1964 | Hetzel | 318—132 X |
| 3,150,337 | 9/1964 | Allison | 331—156 |

MILTON O. HIRSHFIELD, *Primary Examiner.*

D. F. DUGGAN, *Assistant Examiner.*